United States Patent [19]

Howell, Jr. et al.

[11] 4,174,980

[45] Nov. 20, 1979

[54] MELAMINE-FORMALDEHYDE AND TANNIN TREATMENT OF METAL SURFACES

[75] Inventors: John K. Howell, Jr., North Branch; Leonard Kulick, Ferndale, both of Mich.

[73] Assignee: Oxy Metal Industries Corporation, Warren, Mich.

[21] Appl. No.: 927,421

[22] Filed: Jul. 24, 1978

Related U.S. Application Data

[63] Continuation-in-part of Ser. No. 736,278, Oct. 27, 1976, abandoned, which is a continuation of Ser. No. 518,017, Oct. 25, 1974, abandoned.

[51] Int. Cl.² .............................................. C23F 7/00
[52] U.S. Cl. .............................. 148/6.14 R; 148/6.27
[58] Field of Search ............... 148/6.14 R, 6.15 R, 148/6.27

[56] References Cited

U.S. PATENT DOCUMENTS

| | | | |
|---|---|---|---|
| 2,383,589 | 8/1945 | Bunting et al. | 428/90 |
| 2,854,368 | 9/1958 | Shreir | 148/6.15 R |
| 3,397,077 | 8/1968 | Boller et al. | 148/6.15 Z |
| 3,671,331 | 6/1972 | Malkin et al. | 148/6.16 |
| 3,877,998 | 4/1975 | Guhde | 148/6.14 R |
| 4,017,334 | 4/1977 | Matsushima et al. | 148/6.27 |
| 4,039,353 | 8/1977 | Kulick et al. | 148/6.15 R |
| 4,054,466 | 10/1977 | King | 148/6.27 |
| 4,111,722 | 9/1978 | Reghi et al. | 148/6.27 |

FOREIGN PATENT DOCUMENTS 1192487  5/1965  Fed. Rep. of Germany ..... 148/6.15 R

*Primary Examiner*—Ralph S. Kendall
*Attorney, Agent, or Firm*—Arthur E. Kluegel; Richard P. Mueller

[57] ABSTRACT

Disclosed is a single-application non-electrolytic method for the treatment of bare metal surfaces to form a corrosion-resistant coating. The clean metal surfaces are treated with an aqueous composition containing a melamine-formaldehyde resin and a vegetable tannin. The resulting dried coating exhibits superior qualities for a single-application coating process when used as a paint base and the process does not require the use of environmentally objectionable chromium compounds. Application to ferrous, zinc or aluminum surfaces may be by any known technique designed to provide a deposited layer of desired uniformity.

6 Claims, No Drawings

MELAMINE-FORMALDEHYDE AND TANNIN TREATMENT OF METAL SURFACES

CROSS-REFERENCE TO RELATED APPLICATIONS

This application is a continuation-in-part of U.S. Ser. No. 736,278 filed Oct. 27, 1976 (now abandoned) which is, in turn, a continuation of U.S. Ser. No. 518,017 filed Oct. 25, 1974 (now abandoned).

BACKGROUND OF THE INVENTION

This invention relates to an improved process for coating metal surfaces and more particularly relates to improvements in the process for applying a protective paint base coating to metallic surfaces such as zinc, iron and aluminum. The need for applying protective coatings to metal surfaces has long been recognized in the art. These coatings are normally referred to as "conversion coatings" because the metal surface is converted from a chemically active one readily susceptible to oxidation to a surface which is relatively inactive and resistant to oxidation. One of the most important common uses of these conversion coatings is as a base for subsequent painting. Under these circumstances, the user will look to the adhesion of the paint to the metallic surface, as well as the resistance of the painted surface to humidity, salt-spray and similar tests in order to determine the corrosion resistance of the painted article.

In the past, difficulties have often been encountered in developing a method for treating metal surfaces which produces an end product which, when painted, exhibits satisfactory adhesion and corrosion characteristics in all respects. In some instances, it has been possible to obtain satisfactory results by subjecting the metal surface to a series of chemical treatments. The most commonly used process of this type involves a first treatment of the cleaned surface with a conversion coating solution which, for example, may produce zinc or iron phosphate coatings on steel, zinc phosphates or complex oxides on galvanized steel or chromic oxide or phosphate coatings on aluminum followed by a second treatment with a dilute hexavalent chromium-containing composition with an intervening water rinse. However, multiple-stage treating involves additional personnel, inter-stage contamination problems, and extended line length when compared to a single-application process as in the present invention. Because of the potential for inter-stage contamination due to drag-out, rinsing steps must be added which increase the consumption of water and add to disposal and pollution problems. Furthermore, the use of compositions containing hexavalent chromium compounds is environmentally objectionable and should be avoided if possible.

The present invention provides a single-application method for the treatment of bare metal surfaces for the purposes of forming a corrosion-resistant coating for paint base applications thereon. It has been found that, if the metal is contacted with an aqueous working composition containing a melamine-formaldehyde resin and a vegetable tannin, and the thus-treated surface is subsequently dried, a coating is obtained which exhibits characteristics comparable to a conventional conversion coating. If either of the components is omitted from the composition, the conversion coating is deficient in one or more respects. As mentioned, this single-application process has obvious advantages over prior art methods and employing two or more stages to obtain a conversion coating having comparable properties.

U.S. Pat. No. 3,397,077 teaches the use of an aqueous system containing an inorganic oxyacid (such as phosphoric acid) and an organic resin-forming material (e.g. based upon a melamine-formaldehyde reaction product) but makes no suggestion of the advantages of including a vegetable tannin in the composition.

SUMMARY OF THE INVENTION

It has now been discovered that an aqueous coating composition containing a melamine-formaldehyde resin and a vegetable tannin will produce a satisfactory paint base coating on ferrous, zinc and aluminum surfaces.

DESCRIPTION OF THE PREFERRED EMBODIMENTS

The exact composition of the melamine-formaldehyde resin suitable for use in the present invention is not critical although the composition and pH must be optimized depending on the particular paint to be employed. Monomeric, dimeric, and higher order resins are suitable. As is well-known, formaldehyde methylolates the amine groups of the melamine heterocycle after which cross-linkage between the molecules takes place via condensation polymerization. The degree of methylolation is not critical although at least one mole of formaldehyde per mole of melamine is preferred and at least 1½ moles of formaldehyde per mole of melamine is more preferred. The commercially available melamine-formaldehyde resins also include various degrees of short chain alkyl substitution or etherification with for example, methyl, ethyl, propyl or butyl groups. Table I lists a number of the commercially available melamine-formaldehyde resins along with their suppliers. While these resins are suitable, the invention is not limited thereto. The use of tannins for the treatment of metal surfaces has been described in U.S. Pat. Nos. 1,798,218; Re. 24,604; 566,037; 759,986; 1,079,453; 1,501,425; 1,817,174; 2,311,563; 2,854,368; 3,547,710; and 3,578,508. Very small quantities of the tannin material, when included in combination with a melamine-formaldehyde resin, have now been found very effective in increasing the anti-corrosion properties imparted by the treating solution of the present invention. It is desirable to include at least 0.01 g/l of the vegetable tannin in the solution. Most preferably, the weight ratio of the resin to the tannin is in the range of 1:30 to 30:1 with a resin concentration of at least 0.01 g/l. For many paint systems a ratio of resin:tannin of at least 1:1, preferably at least 3.75:1, and most preferably at least 7.5:1 is suitable. Table II lists names of various tannins which may be employed in the present invention together with the suppliers and identification codes. Again, these are only exemplary and the invention is not limited thereto.

Suitable additional components which may also be included comprise the commonly employed metal di- and trivalent cations such as zinc, manganese, cobalt, nickel and iron; nitrate (as disclosed in copending application Ser. No. 399,648); inert coloring agents designed to provide a specific color to the protective coating; silicon compounds; a conductive material to improve weldability such as pulverulent metal as disclosed in U.S. Pat. No. 3,671,331 (zinc) or a conductive carbon as disclosed in copending application Ser. No. 399,646; and stabilizing agents necessary to keep the organic components from separating.

The aqueous compositions may be used without any need for pH adjustment but can be so adjusted if desired. pH values of from 1 to 11 are suitable with pH values of from 2 to 10 preferred.

Aluminum, zinc and ferrous surfaces and alloys containing a predominant portion of these metals may be successfully treated with the composition in accordance with the invention.

TABLE I
MELAMINE-FORMALDEHYDE RESINS

| NAME | SUPPLIER |
| --- | --- |
| CR2024 | Clark Chemical Corporation |
| Resin G-3 | Jersey State Chemical Co. |
| Mel-Tron A | Crown Metro, Inc. |
| Schercomel | Scher Bros. Inc. |
| X-3387 | Cargill, Inc. |
| Uformite MM-83 | Rhom & Haas Company |
| Resydrol WM 501 | American Hoechst Corporation |
| Resimene X 712 | Monsanto Company |
| Resimene X 714 | Monsanto Company |
| Resimene X 720 | Monsanto Company |
| Resimene X 730 | Monsanto Company |
| Resimene X 735 | Monsanto Company |
| Resimene X 740 | Monsanto Company |
| Cymel 370 | American Cyanamid Company |
| Aerotex MW | American Cyanamid Company |
| Aerotex 92 | American Cyanamid Company |
| Tanak M3 | American Cyanamid Company |
| Aerotex P225 | American Cyanamid Company |
| Tanak MRX | American Cyanamid Company |
| Cymel 7273-7 | American Cyanamid Company |

TABLE II
TANNINS

| NAME | SUPPLIER |
| --- | --- |
| Tannic Acid | Merck and Company, Inc. |
| Tannic Acid (NFX11) | S.B. Penick and Company |
| Tannic Acid (Tech. 3C) | The Harshaw Chemical Co. |
| Tannic Acid (Tech. XXX) | The Harshaw Chemical Co. |
| Tannic Acid (Tech 7c) | The Harshaw Chemical Co. |
| Chestnut Extract | The Mead Corporation |
| Spray Dried Chestnut | Arthur C. Trask Corp. |
| Bisulfited Quebracho Extract | Arthur C. Trask Corp. |
| Non-Bisulfited Quebracho Extract | Arthur C. Trask Corp. |
| Wattle Extract | Arthur C. Trask Corp. |
| Cutch Extract | Arthur C. Trask Corp. |

The final film thickness or coating weight is a function of the total concentration of components in the treating composition and the thickness to which the composition is applied to the surface. As the surface is then dried, the composition becomes concentrated and a reaction will begin to take place between the components of the composition to form the coating of the invention.

It is preferred to maintain the temperature of the working composition at fairly low levels in order to avoid any premature reaction between the active components of the composition. Normal ambient temperatures are suitable for the working bath. As temperatures increase, substantial reactions begin to occur in the bath itself.

The metal surface itself may be preheated in order to hasten this drying process. Metal temperatures of up to 200° F. or higher may be employed for roll-on applications without degrading the bath. Much higher temperatures may be employed in connection with mist-on application as disclosed in U.S. Pat. No. 3,578,510. The manner of drying is not critical so long as the liquid film is not unduly disrupted during the drying process, e.g. by air currents or physical contact. If time is not critical, the surfaces may even be permitted to dry at room temperature. However, under normal operations, it is desirable to use elevated oven temperatures and warm air streams of velocity insufficient to disturb the wet film. From a practical standpoint, the oven temperature should result in a metal temperature of between about 125° and 350° F. and preferably between about 150° and 250° F.

Coating weights may vary from as little as one milligram per square foot to as much as 400 milligrams per square foot or higher although as coating weights increase, brittleness of the coating may occur upon drying. Normally, the coating weight will be between 5 and 100 milligrams per square foot. Coating weights for aluminum surfaces will typically be between 5 and 60 mg/ft$^2$, while for zinc and ferrous surfaces the coating weight will typically be at least 20 mg/ft$^2$.

Application of the aqueous composition to the metal surface may be accomplished in any of the conventional manners (spray, immersion, roll-on, flooding) so long as sufficient care is taken to obtain a reasonably uniform thickness of the aqueous film. For flat surfaces such as sheet or strip, this control may be accomplished most readily through the use of rollers, or squeegees. Required contact times from initial application to dry-off can be less than 30 seconds and are usually less than 20 seconds. Mist-on techniques may be employed on preformed articles. The paint is applied to the dried coated surface by conventional means. While the particular paint employed will affect the over-all corrosion resistance and adhesion, with most commercial paints tested the present single application process gave results comparable to those obtained by conventional two or three-stage processes.

It has been found necessary to optionize the composition and pH depending on the particular paint employed and the type of metal surface treated to obtain the superior results of the invention. For example, alkaline pH values, e.g. 8 to 11, are usually preferred for aluminum treatment whereas acid pH values, e.g., 1 to 4 are usually preferred for ferrous metals. The optimum weight ratio of resin:tannin varies depending on the particular paint to be applied over the coated surface. Once the metal type and paint are determined, it is a matter of routine experimentation to determine the optimum composition and pH value to be employed from within the parameters prescribed in the present invention.

Salt Spray Corrosion Resistance

Salt spray corrosion resistance was measured in accordance with the procedure of ASTM B117-61. The panels were rated in terms of the amount of paint loss from a scribe in 1/16 inch increments (N for no loss of paint at any point). The principal numbers represent the general range of the creepage from the scribe along its length whereas the superscripts represent spot or non-representative creepage at the paint of maximum creepage along the length of the scribe. Thus, 2–7$^{10s}$ means representative creepage varied from 2/16 to 7/16" with a maximum of 10/16" at one or two spots. Where corrosion was extensive, the results were expressed as % peel over the entire panel surface, e.g. 60%P.

Humidity Corrosion Resistance

Humidity corrosion resistance was measured in accordance with the procedure of ASTM 2247-64T. The panels were rated in terms of the number and size of the blisters, F for few, M for medium and D for dense, and from 9 for very small size to 1 for very large. 10 represents no blisters. Where the rating is preceded by a G or C, the panel gave a 10 rating except for blisters due to handling (G) or concentration effects (C) such as those which would result from solution run down.

Mek Resistance

A cloth soaked with methyl ethyl ketone is rubbed back and forth at constant pressure across the cured painted surface to remove the paint over approximately a 10 mm length at the point of contact. The number of back and forth rubs is recorded.

Acetic Acid Salt Spray Resistance

Acetic acid salt spray resistance was measured in accordance with ASTM B287. Conditions are similar to ordinary salt spray testing except the salt solution is adjusted to pH 3.2 with acetic acid and the chamber is maintained at 95° F. Ratings are given as in the Salt Spray Test.

Weldability

In the following examples, the "2000 spot weld" test is employed to evaluate the weldability of a coated surface. The test measures the ability of a single pair of electrodes to perform at least 2000 successive spot welds of acceptable quality. Unless the conductivity of the coating is sufficiently high, the welds produced will be unsatisfactory. The test is performed using RWMA Class II copper electrodes in an air-operated, single point press, low inertia welding system. For a minimum metal thickness of 0.036 inches, the prescribed system parameters are an electrode force of 650 pounds, a weld time of 13 cycles, a secondary current of 14,000 amps and an electrode face configuration of 0.25"×45°. For the test, pairs of treated 1×4" coupons and pairs of 4×12" panels are placed with their untreated sides touching. 2000 successive welds are performed. Coupons are welded in two spots and then pulled apart for the initial welds and after each series of 250 welds. One coupon then has a hole at the spot weld and the other has a "bottom" of metal. The button is then measured across its narrowest apparent diameter. The test is a failure if the diameter of weld buttons is less than 0.22". If results are acceptable, the treated metal is considered highly suitable for resistance welding.

Bend Adhesion

The test for paint adhesion is the 180° 0-T bend test. In this test, the painted panel is bent 180°. The radius of the bend may be controlled by bending the test panel around a mandrel of predetermined thickness, usually one or more panels of the same thickness as the test panel. The most severe test is where no mandrel is employed and the panel is bent so that the untreated surfaces are touching. This is the so-called 0-T (zero mandrel thickness) bend. Bending around one panel thickness would be a 1-T bend, etc. After bending, the panel is tested for paint adhesion by the application and removal of a standard transparent tape (Scotch #170). The extent of paint removed by the tape is rated 10 for essentially no removal to 0 for complete removal. Values of 9 through 1 are assigned for intermediate adherence ratings in proportion to % paint adherence to the substrate.

Olsen Draw Adhesion

A 1" diameter tool is used to deform the panel 0.3" by forming a depression in the unpainted side. #710 Scotch tape must show no paint removal and the paint must exhibit little red rust after 240 hour salt spray (A "3" or less rating on a scale of 0 to 8 according to pictoral standards of Ford Motor Company).

In the following examples, all concentrations are net solids unless otherwise specifically noted. The examples are illustrative only and not intended as limitations of the invention.

EXAMPLE 1

An aqueous concentrate solution was prepared to contain:

| Component | Wt. % |
| --- | --- |
| Melamine-formaldehyde Resin (supplied as Resimene X714) | 24.5 |
| Quebracho extract (non-bisulfited) | 1.5 |
| NaOH | 0.25 |
| Water | Balance |

The quebracho was added as an aqueous solution containing a small amount of NaOH for solubilizing. The resin and tannin suppliers are given in Tables I and II.

A treating solution was prepared of the above in Detroit tap water at a concentration of 16.0 g/l corresponding to approximately 4 g/l resin and 0.25 g/l tannin. The pH was adjusted to 3.0 with phosphoric acid (25%). SAE 1010 cold rolled steel panels were then processed according to the sequence.

(1) Alkaline cleaner—1 oz/gal—150° F.
1 minute spray.
(2) Warm Water Rinse
½ minute spray
(3) Treating solution—ambient temperature
½ minute spray
(4) Dry-off oven—5 minutes @ 350° F.

The panels were painted with Dulux 704-6731 white alkyd based paint supplied by DuPont de Nemours, Inc. and subjected to the Salt Spray and Humidity tests for 336 hours. As controls, identical panels were treated with a conventional iron phosphating bath containing approximately 1% PO$_4$ and 0.5% chlorate, water rinsed, and post-treated with a conventional dilute (0.1% CrO$_3$) hexavalent chromium rinse. The results were:

|  | Resin-Tannin Treatment | Conventional Treatment |
| --- | --- | --- |
| Humidity | 10 | 10 |
| Salt Spray | 2-3 | 3-5 |

The results show that the corrosion resistance for resin-tannin treated surfaces as measured by the Salt Spray and Humidity tests is as good as or better than that of conventionally treated surfaces.

EXAMPLE 2

An aqueous treating solution was prepared to contain:

| Component | g/l |
| --- | --- |
| Melamine-formaldehyde resin (supplied as Cymel 7273-7) | 12.6 |
| Quebracho Extract (non-bisulfited) | 1.7 |
| NaOH | 0.16 |
| Triton CF 54 | 0.4 |

Triton CF 54 is a modified polyethoxy adduct supplied by Rohm & Haas Co. The above room-temperature solution was roll-coated onto aluminum (3003 alloy) panels after the panels had been cleaned with the alkaline cleaner of Example 1. The panels were then oven dried at 400° F. for 20 seconds (metal temperature 150°–180° F.). The coating weight was about 10 mg/ft$^2$. Groups of the panels were then separately painted with polyester, acrylic and vinyl-based paints. Thereafter, the panels were subjected to the Salt Spray, Acetic Acid Salt Spray MEK Resistance and Bend Adhesion tests.

The results were:

| | Paint | | |
| --- | --- | --- | --- |
| | Polyester | Acrylic | Vinyl |
| Salt Spray (336 Hr.) | N | N | N |
| Acetic Acid Salt Spray (336 Hr.) | 0–1 | N | |
| MEK Resistance | 200+ | 200+ | — |
| Bend Adhesion (O-T) | 9.8 | 10 | 10 |

These results show that the resin-tannin treatment provides a paint base of acceptable quality.

EXAMPLE 3

A treating solution was prepared to contain:

| Component | g/l |
| --- | --- |
| Melamine-formaldehyde resin (supplied as Tanak MRX) | 10.0 |
| Quebracho Extract (non-bisulfited) | 0.6 |
| NaOH | 0.02 |
| pH | 8.5 |

In this solution, the weight ratio of resin to tannin is 16:1. 3003 aluminum panels were cleaned for 15 seconds in a conventional alkaline cleaner, hot water rinsed for 15 seconds, dipped into the melamine-formaldehyde resin/tannin solution for 5–10 seconds at room temperature, squeegeed, and then oven dried for 5 minutes at 350° F.

The panels were painted with an acrylic paint and subjected to conventional impact, butter forming, knife blade adhesion and 0-T physical tests, and were tested in salt spray for 1008 hrs. Control panels which were cleaned, water rinsed, and dried only were also painted and tested.

The results of the test were as follows:

| Treatment | O-T Bend | Salt Spray 1008 Hrs. |
| --- | --- | --- |
| Clean only | 0 | 0–1 |
| Clean and treated with melamine-formaldehyde/tannin solution | 9.5 | N |

Far superior paint adhesion is observed with panels treated with the new solution as compared to cleaned only panels, as indicated by the 0-T test. Both sets of panels rated excellent in the remaining tests.

EXAMPLE 4

An aqueous composition was prepared to contain approximately:

| Component | g/l |
| --- | --- |
| Cymel 7273-7 | 17.0 |
| Non-bisulfited quebracho extract | 2.5 |
| NaOH | 0.2 |
| Triton CF 54 | 0.6 |
| Zinc dust | 400 |
| Biopolymer XB-23 | 2.0 |
| Water | Balance to 1000g. |

The zinc dust was supplied by ASARCO, Inc. as Federated L-15, and the Biopolymer by General Mills. The above composition was applied to a number of clean cold rolled steel (SAE 1010) panels and dried to give a dry film thickness of about 0.1 mil. A zinc-rich epoxy-based weldable primer paint (W. C. Richards S-7859-1) was then applied to a dry film thickness of 0.5 mils.

Separate panels were then subjected to the previously described tests for Weldability, Bend Adhesion and Olson Draw Adhesion. Excellent results of 10 were obtained for the Bend and Olson Draw adhesions and Weldability was acceptable after 2000 spot welds.

What is claimed is:

1. A process for treating a bare aluminum surface to impart improved corrosion resistance and adhesion of subsequently-applied paint comprising contacting the surface with a chromium-free aqueous composition exhibiting a pH value of from 8 to 11 and containing at least 0.01 g/l of a melamine-formaldehyde resin and at least 0.01 g/l of a vegetable tannin in a weight ratio of resin:tannin of 1:30 to 30:1 and thereafter drying the composition on the surface to yield a coating weight, of from 1 to 400 mg/ft$^2$.

2. The process of claim 1, wherein the surface is subsequently dried at elevated temperature.

3. The process of claim 1, wherein the composition additionally contains a conductive component selected from pulverulent metals and conductive carbon compounds.

4. A process for treating a bare iron surface to impart improved corrosion resistance and adhesion of subsequently applied paint comprising contacting the surface with a chromium-free aqueous composition exhibiting a pH value of from 1 to 4 and containing at least 0.01 g/l of melamine-formaldehyde resin and at least 0.01 g/l of a vegetable tannin in a weight ratio of resin:tannin of 1:30 to 30:1 and therefore drying the composition on the surface to yield a coating weight of from 1 to 400 mg/ft$^2$.

5. The process of claim 4 wherein the surface is subsequently dried at elevated temperature.

6. The process of claim 4 wherein the composition additionally contains a conductive component selected from pulverulent metals and conductive carbon compounds.

* * * * *